United States Patent Office 3,560,618
Patented Feb. 2, 1971

3,560,618
TRIHALOPYRAZINE COMPOSITION AND USE FOR NEMATODE CONTROL
Frances C. O'Melia, Pleasant Hill, Calif., assignor to The Dow Chemical Company, Midland, Mich.
No Drawing. Filed June 21, 1968, Ser. No. 738,835
Int. Cl. A01n 7/00, 9/22
U.S. Cl. 424—250
4 Claims

ABSTRACT OF THE DISCLOSURE

Soil-inhabiting nematodes are controlled by treatment with a nematocidal amount of trichloropyrazine or tribromopyrazine.

BACKGROUND OF THE INVENTION

It is an object of this invention to provide a novel method for the treating and disinfection of soil infested with nematodes. The new practice has been found to improve the ability of the soil to support plant growth to to protect the plants from the ravages of soil-dwelling plant pathogenic nematodes which attack their roots. A further object is to provide novel compositions adapted to be employed in the new method of treatment.

SUMMARY OF THE INVENTION

According to the present invention it has been discovered that soil-inhabiting nematodes which attack the underground portions of plants may be controlled by impregnating soil or growth media with at least one of the compounds trichloropyrazine and tribromopyrazine. For convenience of description, the term "trihalopyrazines" or "trihalopyrazine compounds" is employed herein and in the claims to refer to the trichloropyrazine and tribromopyrazine compounds, as well as mixtures thereof.

The trihalopyrazine compounds which are useful in a practice of this invention are white solids which are generally insoluble in water and somewhat soluble in common organic solvents such as benzene and acetone. Compositions containing one or more of the compounds of the present invention have been found to be very useful in the treatment of soil and other growth media. It is among the advantages of the present invention that the active compounds permeate the media for a distance of several inches from the point of application depending upon the temperature, moisture content, compactness and physical consistency of the media. It is a further advantage that the compounds are sufficiently persistent to accomplish the desired results, but dissipate in a reasonably short period of time.

The distribution of a nematocidal dose of one or more of the compounds is essential for the practice of the present invention. In general, good results are obtained when one or more of the compounds of the present invention is distributed through the soil in the amount of from 1 to 2,000 parts or more by weight per million parts by weight of soil. In field applications, the active compounds may be distributed in the soil at a dosage of from about one quarter to 500 pounds or more per acre, and through such a cross section of the soil as to provide for the presence therein of a nematocidal concentration of toxicant. In such applications, it is desirable that the toxicant be distributed to a depth of at least 12 inches below the soil surface. In the method of the present invention, nematocidal concentrations of the toxicant compound can be applied to the nematode infested soil by such convenient procedures as injection, drenching with an aqueous dispersion, application as a dust or other techniques known to the skilled artisan.

In carrying out the method of the present invention the soil-dwelling nematodes may be controlled by distributing in the soil or other growth media the unmodified trihalopyrazine compound. However, the present method also embraces the employment of a liquid or dust composition containing the compounds. In such usage, the trihalopyrazine compound may be modified with one or more of a plurality of additaments including solvents or other liquid carriers, surface-active dispersing agents and finely divided inert solids. Depending on the concentration of the trihalopyrazine compound employed, such augmented compositions are adapted to be distributed in the soil, or employed as concentrates and subsequently diluted with additional inert carrier to produce the ultimate treating compositions. In compositions wherein the adjuvant or helper is a finely divided solid, a surface-active agent or the combination of a surface-active agent and a liquid diluent, the carrier cooperates with the active component so as to facilitate the invention and obtain an improved and outstanding result.

The exact concentration of the trihalopyrazine compound to be employed in compositions for the treatment of growth media may vary provided a nematocidal dosage of effective agent is supplied. The concentration of toxicant in liquid compositions employed to supply the desired dosage generally is from about 0.00001 to 50 percent by weight, although as high a concentration as 90 percent by weight may be employed. In dusts, the effective weight may be from about 0.01 to 20 percent by weight. In compositions to be employed as concentrates, the trihalopyrazine materials may be present in a concentration of from about 5 to 95 percent by weight.

Liquid compositions containing the desired amount of active ingredient may be prepared by dispersing the toxicants in water or an organic liquid with the aid of a suitable, surface-active dispersing agent such as an ionic or nonionic emulsifying agent. The surface-active dispersing agents are generally employed in the amount of from 1 to 20 percent by weight of the combined weight of the compound and surface-active agent in the composition. Suitable organic liquid carriers include acetone, xylene, toluene, isopropanol, polyglycols, chlorinated hydrocarbons such as methylene chloride, carbon tetrachloride, chlorobenzene and the petroleum distillate such as diesel fuel, kerosene, fuel oil, naphthas, and Stoddard solvent. Among the latter, the petroleum distillates boiling almost entirely under 400° F. at atmospheric pressure and having a flash point above 80° F. are generally preferred, however, any suitable liquid carrier or combination of carriers can be employed. The aqueous compositions may contain a small amount of a water-immiscible solvent whereby, the carrier comprises an aqueous emulsion, namely, a mixture of water, emulsifying agent and organic liquid. In the liquid compositions, the choice of dispersing and emulsifying agent and the amount thereof employed are dictated by the nature of the composition and by the ability of the agent to facilitate the dispersion of the toxicant compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active ingredient is dispersed in and on a finely divided inert solid such as clay, talc, chalk, gypsum and the like. In such operations, the finely divided carrier is mechanically mixed or ground with the trihalopyrazine. Similarly, dust compositions containing the toxicant compounds may be prepared from various solid, surface-active dispersing agents such as bentonite, fuller's earth, attapulgite and other clays. Depending upon the proportions of ingredients, these dust compositions may be employed as concentrates and subsequently diluted with additional solid surface-active dispersing agent or with chalk, talc, diatomaceous earth or gypsum and the like to obtain the desired amount of active ingredient in a composition adapted to be employed for the treatment of soil. Also, such dust compositions may be dispersed in water with or without the aid of a dispersing agent to form spray mixtures.

When operating in accordance with the present invention, the trihalopyrazine compound is dispersed in soil or growth media in any convenient fashion, e.g., by simply mixing with the soil, by applying to the surface of the soil and thereafter dragging or disking into the soil to the desired depth, by employing a liquid carrier to accomplish the penetration and impregnation or by injection or drilling techniques whereby the toxicant is deposited beneath the surface of the soil.

In a further method, the distribution of the trihalopyrazine compound in soil may be accomplished by introducing the toxicants in the water employed to irrigate the soil. In such procedures, the amount of water may be varied with the porosity and water-holding capacity of the soil to obtain the desired depth of distribution of the toxicants.

DESCRIPTION OF THE PREFERRED EMBODIMENTS

The following examples illustrate the invention but are not to be construed as limiting.

Example 1

Acetone solutions containing 5.0 grams of trichloropyrazine per liter of solution are employed for the treatment of a sandy loam soil which is heavily infested with root knot nematodes. In such operations, the soil is placed in sealable containers and injected near its bottom portion in each container with an amount of the solution equivalent to a dosage level of 16 pounds of trichloropyrazine per acre foot of soil. This is equivalent to a dosage of 4 parts by weight of chemical per million parts by weight of soil. The containers of treated soil are then sealed and set aside in a constant temperature room at 70° F. for one week. Following the latter period, the containers are unsealed and allowed to aerate for seven days. Check soil samples are prepared in this same fashion using soil which is treated with an equivalent amount of acetone to which no active chemical is added.

The soils are then planted with cucumber seeds, the seeds being located approximately 1½ inches from the loci of chemical injection. During the following growth period there is observed no adverse effect upon germination and growth of seedling attributable to the presence of residual fumigant. About 3 weeks after planting, the plants are freed from soil, and the roots washed and examined for evidence of nematode attack. The examination of the plants indicates that the treatment with trichloropyrazine gives 100 percent control of the nematodes, while roots of the plants grown in the untreated check soil show heavy galling due to the nematode attack.

Example 2

Tribromopyrazine is dissolved in acetone to prepare solutions containing 5 grams and 10 grams of the tribromopyrazine per liter. These compositions are employed in the manner as described in Example 1 for the treatment of soil heavily infested with sugar beet nematodes. In the treating operations, the soil is placed in sealable containers and injected with the compositions at dosages of 64 and 16 pounds, respectively, per acre foot of soil. These dosages correspond to concentrations of 16 and 4 parts by weight, respectively, per million parts by weight of soil. Check soil samples are similarly prepared by injecting an equivalent amount of acetone, which is free of any active chemical, into the soil. Following the treatment all containers are sealed and set aside in a constant temperature room at 70° F. for one week. At the end of this period, the containers are opened and allowed to aerate for a period of 7 days.

All the soil samples are then planted with rape seeds, the seeds being positioned approximately 1½ inches from the point at which the chemical is injected. About 3 weeks after planting, the plants are freed from soil, the roots washed and examined for evidence of nematode attack. The examination discloses that the treatment at both dosage levels has provided good protection, that at the 64 pound level affording 83 percent protection against nematode attack and that at the 16 pound level giving 75 percent protection. In contrast, the plants grown in the check soil are heavily infested with the beet root nematodes.

Example 3

An aqueous composition containing tribromopyrazine as sole toxicant is prepared and employed as a drench to treat sandy loam soil infested with root knot nematodes. In such an operation, the tribromopyrazine is dissolved in acetone which is injected into the water to produce an aqueous solution containing 25 parts of toxicant per million parts of ultimate mixture. This aqueous solution is added to containers of sandy loam soil of good nutrient content and containing about 80 percent sand, 14 percent silt and 6 percent clay. In the treating operations the aqueous composition is applied as a drench in an amount sufficient to wet the soil completely and give a dosage of the tribromopyrazine of approximately 20 pounds per acre foot of soil. This dosage corresponds to a concentration of approximately 5 parts by weight per million parts by weight of soil. Thereafter the treated soil in the containers is allowed to stand open to the air at greenhouse temperature for 4 days. Following this period, the soil is planted with cucumber seeds. Check soils treated only with acetone are planted in the same manner. The seeded soil samples are maintained in a greenhouse under growth conditions. About 3 weeks after planting, it is observed that the plants grown in the tribromopyrazine treated soil present a healthy appearance. The plants are then freed from soil and the roots washed and examined for root knot nematode control. While the roots of the plants frm the check beds are severely affected with galls attributable to nematode attack, the roots of the plants grown in the treated soil are relatively free of such attack, the examination showing at least a 70 percent control of the disease.

Example 4

45 parts by weight of one of trichloropyrazine and tribromopyrazine, 80 parts by weight of chlorobenzene and 5 parts of a dimeric alkylated aryl polyether alcohol (Triton X–155) are mechanically mixed together to prepare fumigant compositions in the form of emulsifiable liquids. In a similar manner, 90 parts by weight of one of trichloropyrazine and tribromopyrazine are mixed together with 10 parts by weight of Triton X–155 to prepare concentrate compositions in the form of wettable powders.

These compositions are adapted to be dispersed in water to prepare aqueous fumigant compositions which have very desirable wetting and penetrating properties. The latter aqueous compositions may be employed to fumigate soil and distribute trichloropyrazine and tribromopyrazine therein in parasiticidal concentrations.

In a further operation, 20 parts by weight of one of trichloropyrazine and tribromopyrazine, 75 parts of fuller's earth, 3 parts of an alkyl aryl sulfonate (Nacconol NR) and 2 parts of a polymerized sodium salt of substituted benzoid alkyl sulfonic acid (DAXAD) No. 27) are mechanically mixed and ground together to prepare a wettable powder composition. This composition can be applied directly to the soil or it can be dispersed in water or other liquid medium, with the resulting liquid composition then being applied to the soil. In either case the soil is provded with a parasiticidal concentration of the active chemical.

Example 5

90 parts by weight of trichloropyrazine is intimately mixed with 12 parts by weight of Triton X–155 and the resulting composition thereafter dispersed in water to prepare a composition containing about 25 pounds of trichloropyrazine per 200 gallons of ultimate mixture. The latter composition, while under agitation is metered into irrigation water at the pump inlet at the rate of 2 gallons per 1,000 U.S. gallons of the irrigation water. About 3 inches of the irrigation water is applied to land, which is heavily infested with root knot nematodes, to accomplish the wetting of the soil to about an 18 inch depth. This is equivalent to a dosage of approximately 13.5 pounds of trichloropyrazine per acre foot of soil and to about 3.4 parts by weight of the chemical per million parts by weight of soil. A few weeks after the treatment the soil is planted with tomato seeds. Eight weeks after the seeding, the resulting stand of tomato plants is examined and found to be substantially free of nematode attack.

Example 6

Trichloropyrazine is dissolved in acetone to produce a fumigant composition containing 500 grams of the active chemical per liter of the ultimate mixture. This composition is employed for the treatment of a seed bed containing a sandy loam soil which is heavily infested with root knot nematodes. At time of treatment the soil, which is similar in composition to that described in Example 3, has a moisture content of about 8 percent. The distribution is accomplished by injecting the fumigant solution into the soil in rows 12 inches apart, the injections being made at 6 inch intervals and at a depth of about 6 inches below the soil surface. The amount of fumigant employed is sufficient to supply 8 pounds of trichloropyrazine per acre foot of soil. This is equivalent to a dosage level of 2 parts by weight of active chemical per million parts by weight of soil. Following the application, the average soil temperature is about 70° F. for the period of the determination.

Seven days after treatment the soil is seeded with cucumber seeds, the seeded soil being that positioned approximately 6 inches from the loci of treatment. Check plots in the same nematode-infested area are also treated in this same fashion, but only with acetone which is free of active chemical, after which they are planted with cucumber seeds. During the growing period there is observed no adverse effect up on the germination and growth of seedling attributable to nematode attack in the trichloropyrazine treated soil. The examination of the plants indicates that good control of the nematodes is obtained in the treated soil, as compared with a heavy nematode infestation in the check plots.

The expression "soil" is employed herein in its broadest sense to be inclusive of all conventional "soils," as defined in Webster's New International Dictionary, Second Edition, Unabridged, published in 1937, G. C. Merriam Co., Springfield, Mass. Thus, the term refers to any substance or medium in which vegetative organisms may take root and grow, and is intended to include not only earth, but also compost, manure, muck, sand and the like, adapted to support plant growth.

The trichloropyrazine and tribromopyrazine compounds employed in a practice of the present invention can be prepared by methods known to the skilled in the art. For example, trichloropyrazine can be prepared by reacting methylpyrazine with an excess of chlorine in the gaseous phase at temperatures of from about 400° to 500° C. In this reaction trichloropyrazine is produced along with other chloropyrazines and can be recovered from the reaction mixture by a practice of fractional distillation, solvent recrystallization or other known recovery processes. Additional methods for synthesizing trichloropyrazine from 2,6-trichloropyrazine-4-oxide and by chlorination of 2,3-dichloropyrazine are described in Farmaco, Ed. Sci. 21 (11), 80–10 (1966), the preparation of 2,3-dichloropyrazine being described at pages 799–804 of the same journal. Trichloropyrazine has an M.P. of 30–32° C. and is highly soluble in acetone and benzene and very slightly soluble in water.

Tribromopyrazine can be prepared by the direct bromination of pyrazine in the vapor phase at temperatures of from 500° to 625° C., processes of this character being described in U.S. Pats. Nos. 2,524,431, dated Oct. 3, 1950 and 2,573,268, dated Oct. 30, 1951. In another method, tribromopyrazine can be prepared by the reaction of hydrogen bromide with trichloropyrazine. In this method, hydrogen bromide gas is bubbled through a heated solution of trichloropyrazine in glacial acetic acid for several hours. A product rich in tribromopyrazine can be recovered as a white solid when the reaction product is quenched with water, and the tribromopyrazine can be recovered therefrom in any desired degree of purity by the use of solvent recrystallization or other known separation and purification methods. Tribromopyrazine has an M.P. of 40°–41° C. and is highly soluble in acetone and benzene and very slightly soluble in water.

I claim:
1. The method for controlling nematodes in soil which comprises applying to nematodes in soil a nematocidally effective amount of at least one trihalopyrazine compound selected from the group consisting of trichloropyrazine and tribromopyrazine.
2. The method in accordance with claim 1 wherein the trihalopyrazine compound is employed in an amount of from about 1 to about 2000 parts by weight per million parts by weight of nematode infested soil.
3. The method in accordance with claim 2 wherein the trihalopyrazine compound is trichloropyrazine.
4. The method in accordance with claim 2 wherein the trihalopyrazine compound is tribromopyrazine.

References Cited

UNITED STATES PATENTS

| 2,524,431 | 10/1950 | Dixon et al. | 260—250 |
| 3,158,612 | 11/1964 | Bernardi et al. | 260—250 |
| 3,287,451 | 11/1966 | Carrara et al. | 260—250 |
| 3,452,016 | 6/1969 | Horne | 260—250 |

ALBERT T. MEYERS, Primary Examiner

A. J. ROBINSON, Assistant Examiner